United States Patent [19]

Miki et al.

[11] Patent Number: 5,113,512
[45] Date of Patent: May 12, 1992

[54] SYSTEM FOR MANAGING A STORAGE MEDIUM REDUCING PHYSICAL SPACE NEEDED

[75] Inventors: Tadashi Miki, Osaka; Masayuki Kozuka, Moriguchi; Hirotoshi Uehara, Yawata, all of Japan

[73] Assignee: Matsushita Electric Industrial Co., Ltd., Osaka, Japan

[21] Appl. No.: 369,585

[22] Filed: Jun. 20, 1989

[30] Foreign Application Priority Data

Jun. 21, 1988 [JP] Japan .................. 63-153246
Jun. 21, 1988 [JP] Japan .................. 63-153247

[51] Int. Cl.$^5$ .......... G06F 3/06; G06F 13/04; G06F 13/08
[52] U.S. Cl. .................. 395/425; 364/254.3; 364/256.3; 364/968; 364/970.3
[58] Field of Search .................. 364/200, 900

[56] References Cited

U.S. PATENT DOCUMENTS

| 4,042,911 | 8/1977 | Bourke et al. | 364/200 |
| 4,123,794 | 10/1978 | Matsumoto | 364/200 |
| 4,228,501 | 10/1980 | Frissell | 364/200 |
| 4,262,332 | 4/1981 | Bass et al. | 364/200 |
| 4,434,487 | 2/1984 | Rubinson et al. | 364/200 |
| 4,435,752 | 3/1984 | Winkelman | 364/200 |
| 4,682,305 | 7/1987 | Ishikawa | |
| 4,779,080 | 10/1988 | Coughlin et al. | 364/200 |
| 4,783,705 | 11/1988 | Moon et al. | 364/200 |

FOREIGN PATENT DOCUMENTS 0106661 4/1984 European Pat. Off. .

OTHER PUBLICATIONS

IBM Technical Disclosure Bulletin (Nov. 1987).

Primary Examiner—Michael R. Fleming
Assistant Examiner—Robert S. Hauser
Attorney, Agent, or Firm—Panitch Schwarze Jacobs & Nadel

[57] ABSTRACT

A system for managing a storage medium such as a write-once type optical disk in which addresses of logical blocks are assigned in accordance with the kinds of information to be recorded, and the number of physical sectors necessary for recording or reproduction on the basis of the logical block addresses. The number of physical sectors to be used can be reduced, improving the efficiency of the storage medium. Two or more kinds of information can be mixedly recorded in one physical block. The OS can manage the physical blocks as logical blocks in which the two or more kinds of information are separately recorded.

6 Claims, 17 Drawing Sheets

| START ADDRESS (LBN) | ACCESS INF. | CORRESPONDING ADDRESS (PSN) |
|---|---|---|
| 100 | SECTOR SIZE CHANGE | 200 |
| 200 | | NOT USED |
| 300 | | NOT USED |
| 400 | ORDINARY PROCESS | 300 |
| 500 | | NOT USED |
| 600 | | 500 |
| 700 | | 700 |
| 800 | | NOT USED |
| 900 | | NOT USED |
| . | . | . |
| 9900 | | NOT USED |

Fig. 7

| START ADDRESS (LBN) | ACCESS INF. | CORRESPONDING ADDRESS (PSN) |
|---|---|---|
| 100 | SECTOR SIZE CHANGE | 200 |
| 200 | | 900 |
| 300 | | NOT USED |
| 400 | ORDINARY PROCESS | 300 |
| 500 | | NOT USED |
| 600 | | 500 |
| 700 | | 700 |
| 800 | | NOT USED |
| 900 | | NOT USED |
| ... | | ... |
| 9900 | | NOT USED |

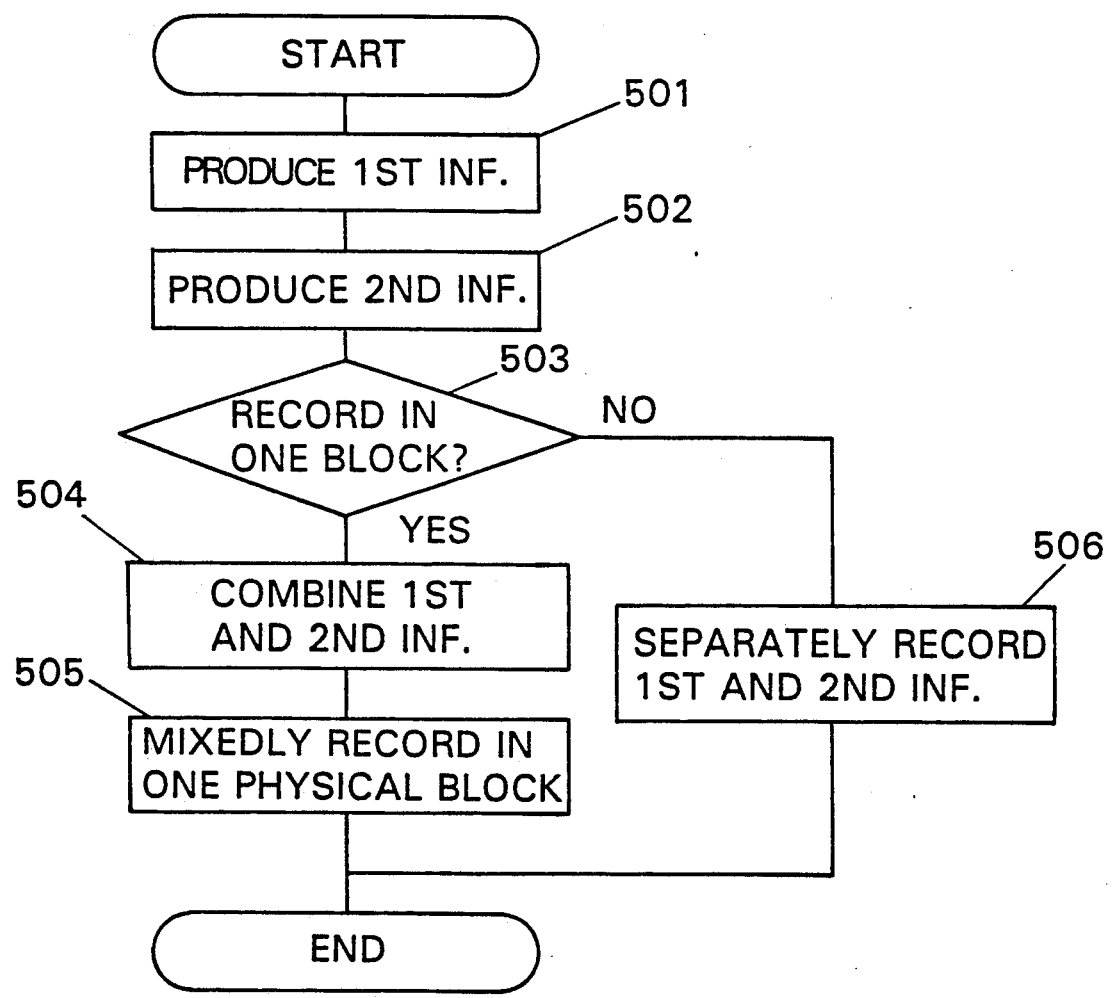

Fig. 16

| START BLOCK (LBN) | ACCESS INF. | CORRESPONDING BLOCK (PBN) |
|---|---|---|
| 00 | ORDINARY PROCESS | 00 |
| 100 | | NOT USED |
| 200 | 1ST INF. REPRODUCTION | 100 |
| 300 | | 200 |
| 400 | ORDINARY PROCESS | NOT USED |
| 500 | 2ND INF. REPRODUCTION | 100 |
| 600 | | 200 |
| 700 | ORDINARY PROCESS | NOT USED |
| . . . | | . . . |
| 9900 | | NOT USED |

701 — START BLOCK (LBN)
702 — ACCESS INF.
703 — CORRESPONDING BLOCK (PBN)

SYSTEM FOR MANAGING A STORAGE MEDIUM REDUCING PHYSICAL SPACE NEEDED

BACKGROUND OF THE INVENTION

1. Field of the Invention

The present invention relates to a system for managing a storage medium which is to be used as an external storage medium for a computer system.

2. Description of the Prior Art

In the management of a storage medium in a general purpose operating system (hereinafter referred as merely "OS"), it is usual to divide the address space into logical blocks of a fixed size and to use serial numbers (Logical Block Number: LBN) assigned to these logical blocks. Usually, these logical blocks correspond by one to one to physical blocks which are obtained by dividing the storage medium into the same size as that of the logical blocks, under the management of the basic input/output system, (hereinafter abbreviated as "BIOS") of the OS. The size of a physical block is n times (n is an integer of one or more) of a physical sector which is the smallest unit of the storage medium recorded or reproduced by a drive unit, and the physical block is composed of consecutive "n" physical sectors. In the case that an optical disk is used as a storage medium, the size of a logical block is about 2 to 8 KB, and the size of a physical sector is about 512 B to 1 KB.

Therefore, the recording and reproduction processes between the OS and a storage medium is executed by the unit of this logical block size. That is, a memory drive unit can conduct the recording and reproduction processes by the unit of "n" physical sectors.

However, this management system using the logical block as the unit has a problem that some portions of a storage medium become useless in the case where the size of data to be recorded is smaller than that of the logical block. More specifically, even when the size of data to be recorded is several hundreds of bytes, which can be stored in one physical sector, the OS can manage the recording or reproduction process of the data only by the unit of a logical block, using the LBN. Hence, the not-used space in the logical block causes futile physical sectors, resulting in an inferior utilization ratio of the storage medium. In a write-once type optical disk, an area which has been used once cannot be used again. When an area of a write-once type optical disk has been used once as such a futile physical sector, therefore, it is impossible to use this physical sector again. When a write-once type optical disk is used as a storage medium, therefore, the utilization ratio of the storage medium is remarkably reduced.

This problem in the prior art will be described in more detail by exemplifying the following two cases.

(1) Recording of management data in an update process in a general purpose OS

In the file system of a general purpose OS, data stored in a storage medium are classified into ordinary data files and management data. For example, in an OS wherein directories are used for conducting the hierarchical management of files, a directory file (hereinafter referred as "DF") to be managed includes identifiers and/or recording positions in a storage medium of files to be stored in the corresponding directory. Such a DF is mixedly recorded together with data files, and controlled by the unit of a logical block.

Therefore, a DF the size of which is usually several hundreds of bytes is recorded by the unit of a logical block ("n" physical sectors) the size of which is several kilo bytes, resulting in that futile physical sectors are recorded.

(2) Recording of different kinds of data produced in a series of processes wherein a process of reproducing each kind of data occurs separately.

When data of a first kind and data of a second kind both of which are small in size are successively produced and a recording process of each data is executed on each data production as shown in a flow chart of FIG. 17, the data of the first kind and those of the second kind are separately recorded in a different logical block of a storage medium, because a reproduction process for each kind of the data is executed at separate timings. Namely, each of the first and second kinds of data must be recorded in a different logical block. Even when the data of the first and second kinds are very small in size (e.g., several hundreds bytes), each kinds of data are to be recorded by the unit of a logical block, resulting in that futile physical sectors are recorded.

An example of such a process is a record process in which key word data (the first data) and document storage position data (the second data) are recorded in a document file system. The size of either of the data is considerably small in comparison with the size of a logical block. However, the process for reading the key word data and that for reading the document storage position data are separately executed, i.e., the former process is executed when searching for each document, and the latter process is done when displaying the result of search with reference to the storage position of the searched document.

Another example is the process of updating management data in a control system in which the standard format for a 5" read-only optical disk (CD-ROM) can be used for a write-once type optical disk (for example, Nikkei Electronics, No. 452, Jul. 25, 1988). In this updation process, an updated directory file corresponds to data of the first kind, and the history data of a path table which is a batch management table of directory files corresponds to data of the second kind. The process of reading the history data and that of reading an updated directory file are carried out separately, namely, the former is executed in the initialization when replacing a disk, and the latter is executed on a file access. Moreover, in comparison with the size of logical blocks (in this case, 2 KB), the size of the history data and that of the updated directory file are considerably small, i.e., the history data is only about 100 bytes and the updated directory file is about several hundreds of bytes.

SUMMARY OF THE INVENTION

The system for managing a storage medium of this invention, which overcomes the above-discussed and numerous other disadvantages and deficiencies of the prior art, comprises a control means for recording and reproducing information on and from the storage medium by the unit of a physical sector; a file managing means for instructing the recording and reproduction processes by the unit of a logical block; and an address translation means for translating the instruction of said file managing means into an instruction in the term of a physical sector, said address translation means determining the number of physical sectors to be reproduced by said control means on the basis of the address and number of the logical block designated by said file managing means.

In a preferred embodiment, the address translation means comprises a sector size changing means for changing the form of the contents reproduced from a physical sector to that in the unit of a logical block.

In a more preferred embodiment, data include file data and management information, and said system further comprises a judging means for judging whether the sector size change is to be conducted or not when the instruction to said address translation means relates to a logical block for said management information.

In a more preferred embodiment, the address translation means comprises an address translation table in which logical block addresses are correlated to physical sectors by the unit of a logical page combining a fixed number of logical blocks, and the judgement for whether the sector size change is to be conducted by the unit of a logical page or not is done on the basis of said address translation table.

In a more preferred embodiment, information for correlating logical pages is additionally recorded into said address translation means, thereby newly setting recording areas for said logical pages in said storage medium.

In a preferred embodiment, the storage medium is of a write-once type.

The system for managing a storage medium of this invention comprises: a control means for recording and reproducing information on and from the storage medium by the unit of a physical block; a file managing means for instructing the recording and reproduction processes by the unit of a logical block; and an address translation means for translating the instruction of said file managing means into an instruction in the term of a physical block; said address translation means comprising a reproduction processor by which the reproduction of one kind of information from a physical block in which two or more kinds of information are recorded is conducted as the reproduction from a physical block in which one kind of information is recorded.

In a preferred embodiment, the system further comprises a record process means for judging whether at least one of said two or more kinds of information has a variable length or not and whether said two or more kinds of information are to be mixedly recorded in one physical block or not.

In a more preferred embodiment, the address translation means comprises a block size changing means for changing the form of the contents reproduced from a physical block to that in the unit of a logical block.

In a more preferred embodiment, the address translation means comprises an address translation table in which logical block addresses are correlated to physical blocks by the unit of a logical page combining a fixed number of logical blocks, and the judgement for whether the block size change is to be conducted by the unit of a logical page or not is done on the basis of said address translation table.

In a more preferred embodiment, information for correlating logical pages is additionally recorded said address translation means, thereby newly setting recording areas for said logical pages in said storage medium.

In a more preferred embodiment, the storage medium is of a write-once type.

In a more preferred embodiment, the two or more kinds of information include directory information and path table change information in the system for managing a write-once type optical disk which is compatible with a CD-ROM.

Thus, the invention described herein makes possible the objectives of:

(1) providing a system for managing a memory medium which can improve the utility ratio of the memory medium;

(2) providing a system for managing a memory medium in which the number of physical sectors to be used can be reduced;

(3) providing a system for managing a memory medium in which two or more kinds of information can be recorded in one logical block; and (4) providing a system for managing a memory medium in which two or more kinds of information recorded in one logical block can be managed as if they are separately recorded in different logical blocks.

BRIEF DESCRIPTION OF THE DRAWINGS

This invention may be better understood and its numerous objects and advantages will become apparent to those skilled in the art by reference to the accompanying drawings as follows:

FIG. 5 shows an example of the address translation table.

FIG. 7 shows the address translation table in the example of FIG. 6.

FIG. 14 is a flow chart of determining the way of conducting the recording process in the system of FIG. 13.

FIG. 16 shows an address translation table in the system of FIG. 13.

DESCRIPTION OF THE PREFERRED EMBODIMENTS (A) Preferred embodiments for above-mentioned case (1) will be described.

Figure 1:
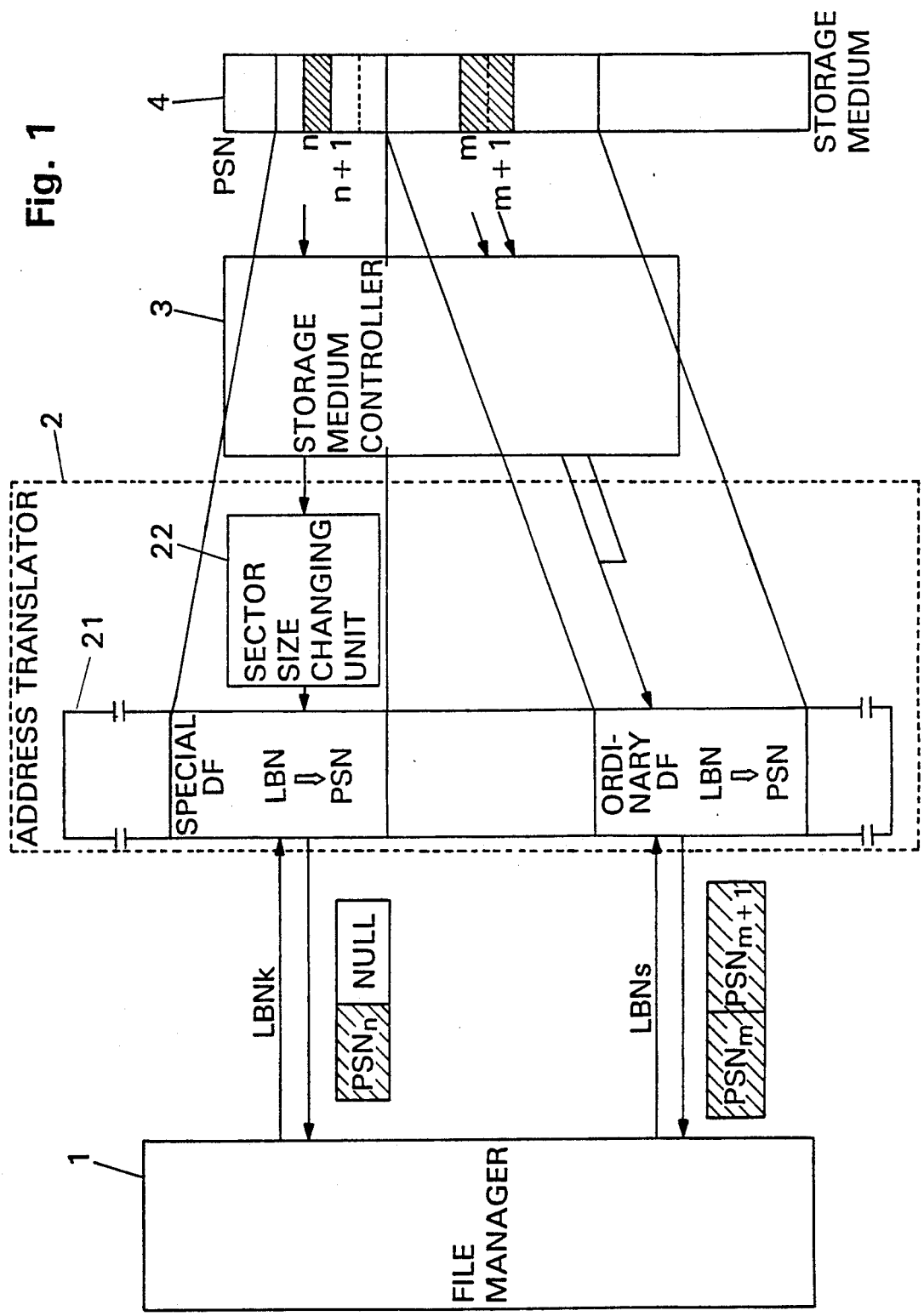
FIG. 1 is a block diagram of a system of the invention.
Figure 2:
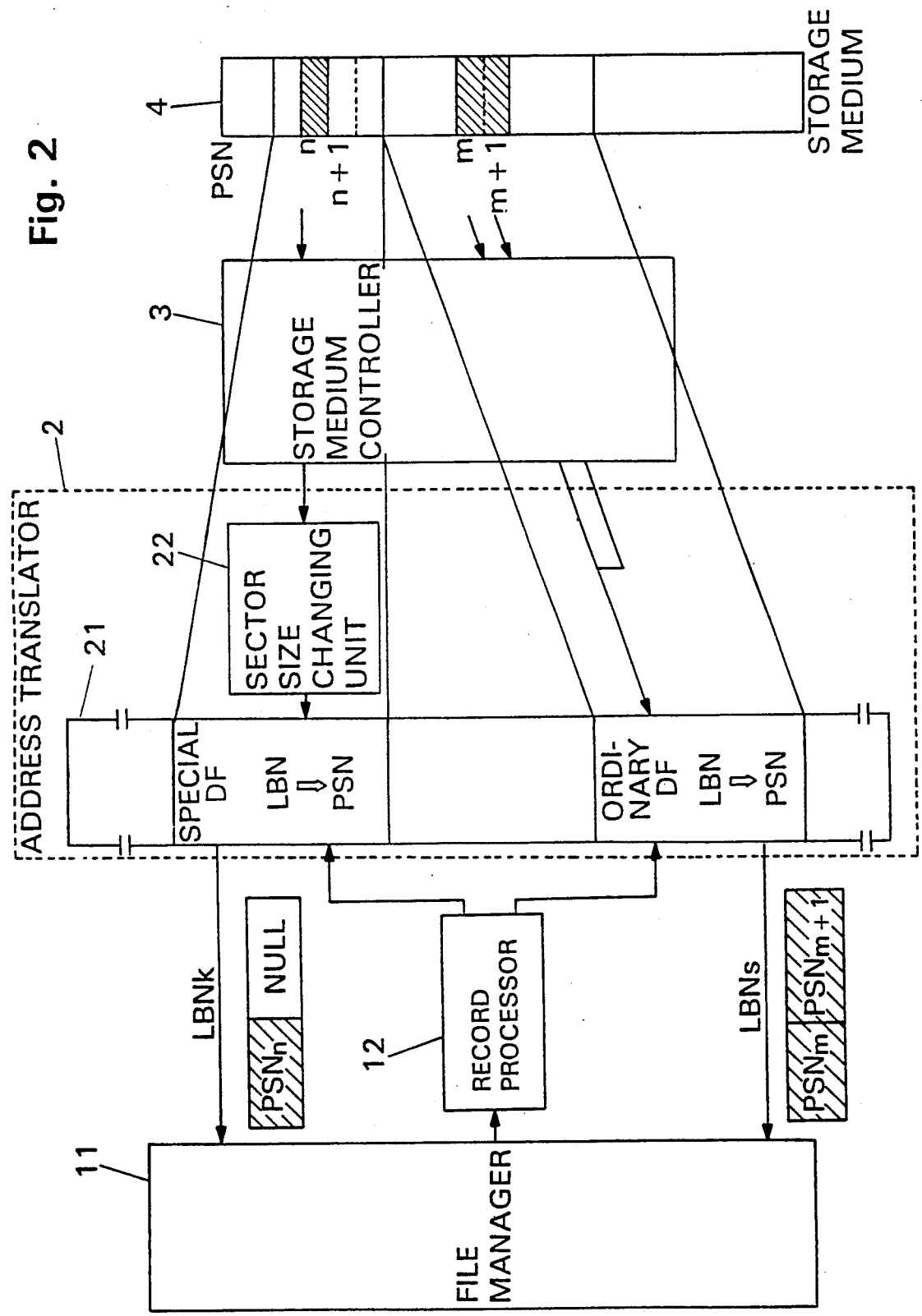
FIG. 2 is a block diagram of a system of the invention which is installed in a general purpose OS.

FIG. 1 shows diagrammatically a system for managing a storage medium according to the invention. The system of FIG. 1 in which a write-once type optical disk is used as a storage medium 4 comprises a file manager 1, an address translator 2, and a storage medium controller or driver 3 for recording and reproducing information by the unit of a physical sector. The address translator 2 translates a recording/reproducing command using a logical block address (LBN) designated by the file manager 1 into a recording/reproducing command for the corresponding physical sector address (Physical Sector Number: PSN). The address translator 2 comprises an address translation table 21 in which data for correlating LBNs with PSNs and processes therefor are recorded, and a sector size changing unit 22 which records or reproduces physical sector(s) by the process indicated by the address translation table 21. The address translation table 21 may be incorporated in the BIOS or device driver of a general purpose OS. In the embodiment illustrated in FIGS. 1 to 9, the size of logical blocks is two times that of the physical sectors (e.g., a logical block is 2 KB and a physical sector is 1 KB). FIG. 2 illustrates the configuration wherein the system of FIG. 1 uses a general purpose OS.

Figure 3:
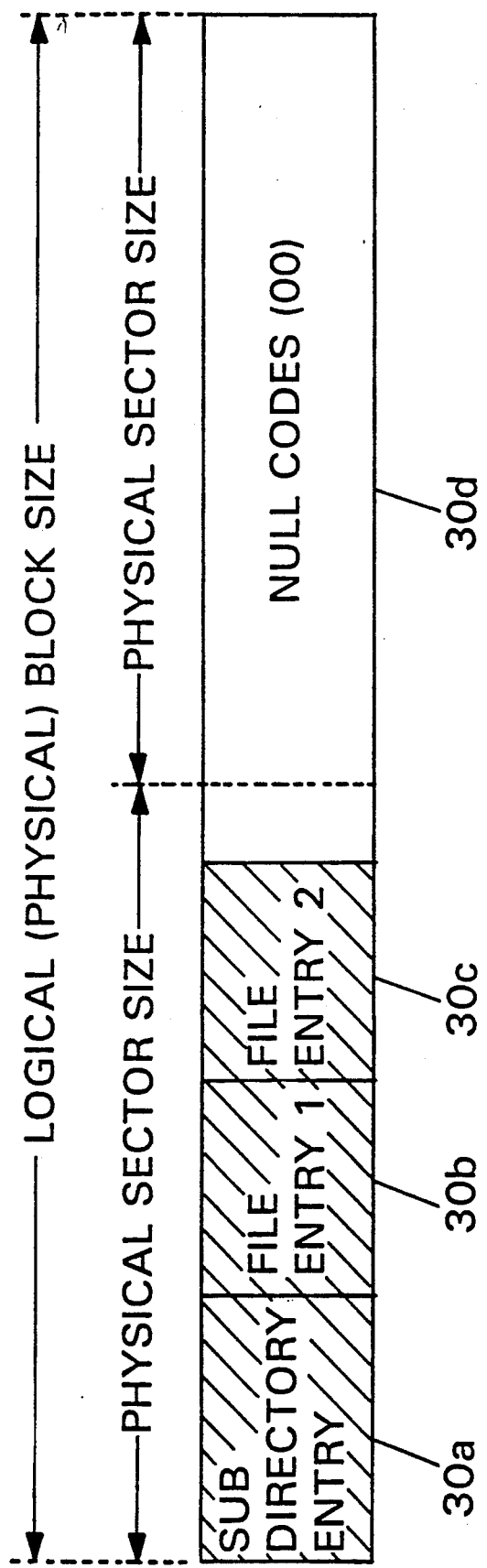
FIG. 3 shows diagrammatically a DF used in a general purpose OS.

FIG. 3 shows an example of a DF in which the file management based on the hierarchical directory can be conducted in a general purpose OS. The DF comprises a sub directory entry 30a in which the recording position, size and identifier of the DF of the sub directory are recorded, and first and second file entries 30b and 30c in which the recording position, size and identifier of the file stored in the directory are recorded. Positions and sizes stored in the entries 30a-30c (hatched areas in FIG. 3) are designated by an LBN and the number of logical blocks, respectively. The area 30d which is the area other than the entries 30a-30c is not used. The not-used area 30d stores NULL codes (00).

When the DF shown in FIG. 3 is recorded in a write-once type optical disk using a conventional system, the areas of NULL codes which occupies the latter physical sector of 1 KB become useless. In contrast, when management data such as the shown in FIG. 3 in which the information-storing areas 30a-30c can be accommodated in one physical sector (hereinafter such a DF is referred as "a special DF") are recorded in this embodiment, the information stored only in the former physical sector are recorded, and the data (NULL codes) stored in the latter physical sector are not recorded. When management data such as a DF in which information-storing areas are accommodated in two physical sectors or data files are recorded in this embodiment of the invention, the data of both the two physical sectors (i.e., the data in one logical block) are recorded. Hereinafter, such a DF is referred as "an ordinary DF".

As described above, in this embodiment, the number of the physical sectors to be recorded is changed according to the size of each information to be recorded, thereby effectively improving the utilization ratio of an optical disk.

Figure 8:
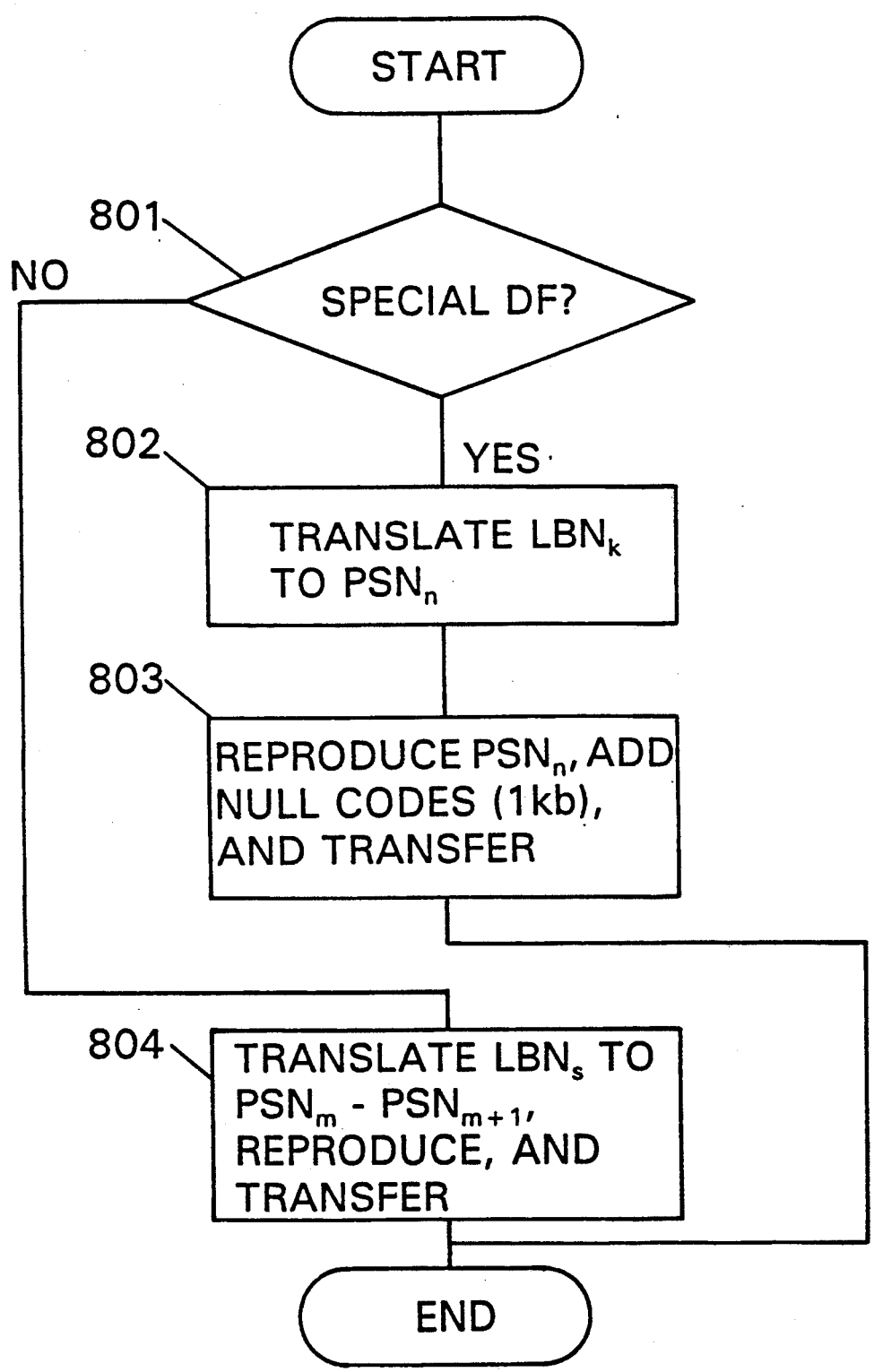
FIG. 8 is a flow chart of the reproduction process in the system of FIG. 2.

With reference to FIGS. 1 and 8, the reproduction process will be described. When the file manager 1 requests the reproduction of information by designating an LBN, the address translator 2 executes the reproduction process in accordance with the algorithm indicated in the flow chart of FIG. 8. In step 801, it is judged whether, in the address translation table 21, the LBN indicates a recording area for a special DF. If yes, the operation proceeds to step 802, and, if no, the operation proceeds to step 804. In FIG. 1, $LBN_k$ designates an LBN indicating a recording area for a special DF, and $LBN_s$ designates an LBN not indicating a recording region for a special DF. In step 802, the $PSN_n$ corresponding to the $LBN_k$ is calculated, and then the operation proceeds to step 803. In step 803, the information stored in the $PSN_n$ is reproduced, and the sector size changing unit 22 adds NULL codes of 1 KB to the end of the reproduced information to adjust the size of the reproduced information. The reproduced information the size of which has been adjusted so as to be the length of two physical sectors is transferred to the file manager 1.

In step 804, the reproduction process of the ordinary DF is conducted. $PSN_m$ and $PSN_{m+1}$ corresponding to the LBNs are calculated using the address translation table 21. The information stored in the two physical sectors $PSN_m$ and $PSN_{m+1}$ is reproduced to be transferred to the file manager 1.

Figure 9:
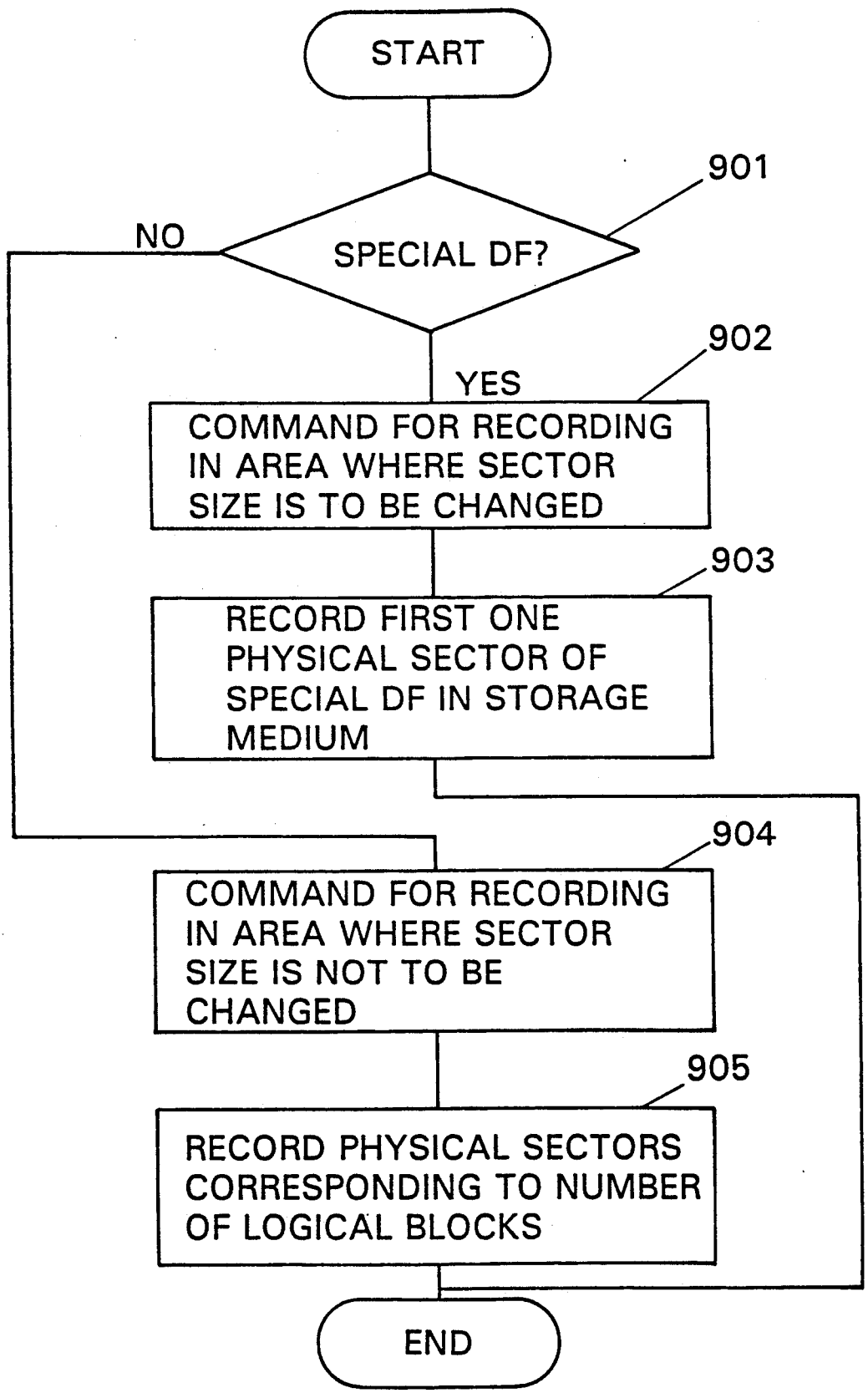
FIG. 9 is a flow chart of the recording process in the system of FIG. 2.

The recording process in the embodiment will be described with reference to FIGS. 1, 2 and 9. The flow chart of FIG. 9 shows the algorithm by which a record processor 12 determines the way of executing the recording process. In step 901, it is judged whether the DF to be recorded is a special DF or not. If yes, the operation proceeds to step 902, and, if no, the operation proceeds to step 904. In step 902, the command for recording the information into the area to which the sector adjustment process is to be executed is issued, and the operation proceeds to step 903 where the information stored in the first one physical sector of the special DF is recorded through the address translator 2.

In step 904, the command for recording the information into the area to which the sector adjustment process is not to be executed is issued, and the operation proceeds to step 905 where information is recorded in physical sectors the number of which corresponds to the number of the indicated logical blocks, through the address translator 2.

As described above, the record processor 12 determines the LBN in accordance with the kind or amount of information to be recorded. A general purpose OS, which generally conducts the recording and reproduction processes by the unit of a logical block, does not have a means which functions as the record processor 12. When the preferred embodiment is realized using a general purpose OS, therefore, it is necessary to additionally incorporate the record processor 12 into the OS, as shown in FIG. 2. However, it is not necessary to modify the reproduction process of the OS so that the reproduction process of a conventional application software can be used without modification. In other words, even when using a general purpose OS, information on an optical disk can be reproduced in the same way as that on a magnetic storage medium or the like.

The judgement of LBN using the address translation table 21 may be conducted on each logical block. However, this makes the address translation table 21 large, so that it is practically impossible to realize such a system. In the preferred embodiment, therefore, the judgement is conducted by the unit of a logical page in which a fixed number of logical blocks are bundled. This judgement in the preferred embodiment in which 100 logical blocks constitute one logical page will be described with reference to FIGS. 4 to 7.

Figure 4:
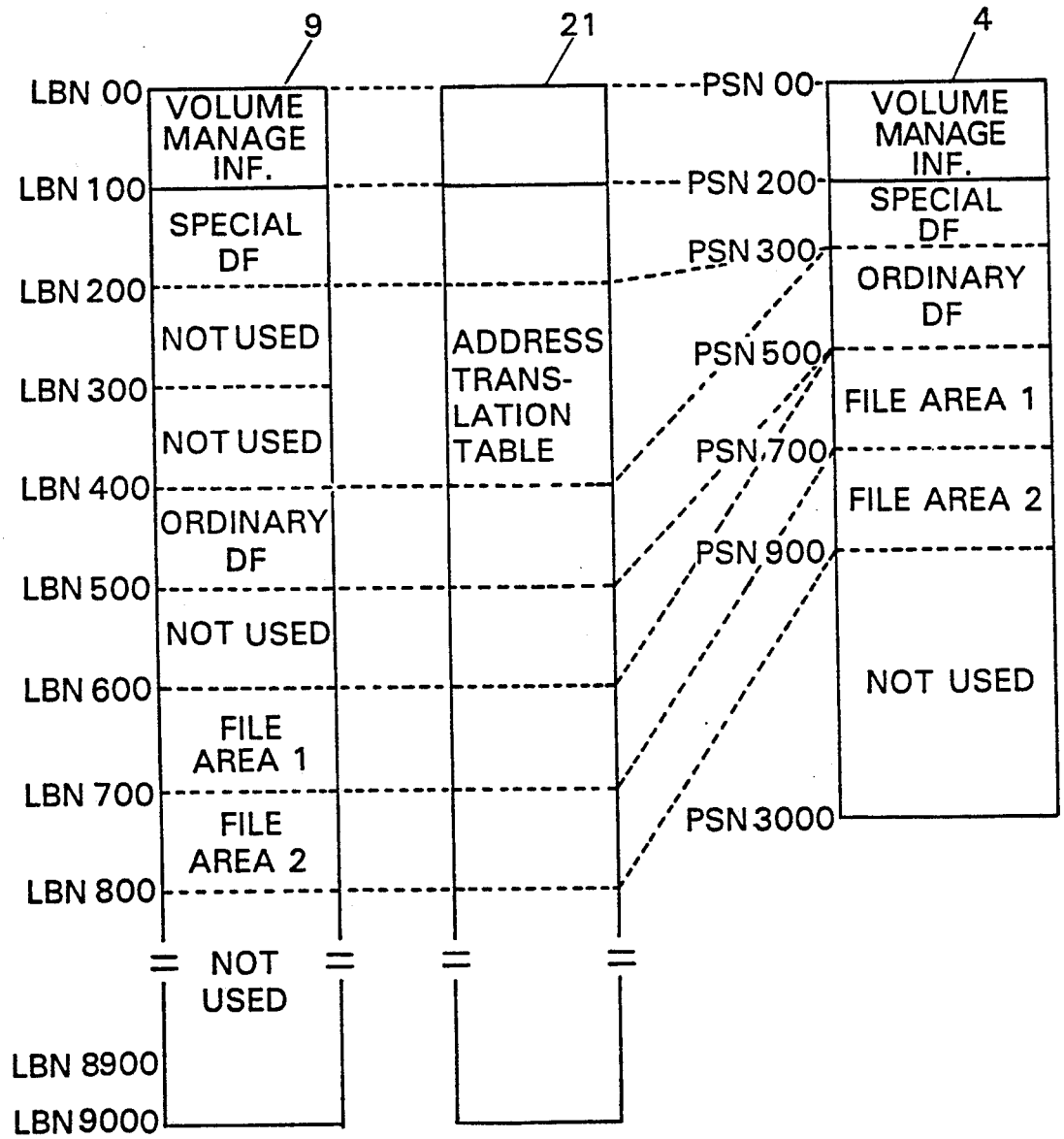
FIG. 4 shows diagrammatically the relation between LBNs with PSNs.

In FIG. 4, the reference numeral 9 designates the logical address space allotted by LBNs which can be identified by the file manager 1, and the broken lines indicate the relations between the contents in each logical page and the positions in the optical disk 4. For example, the contents in $LBN_{100}$ to $LBN_{199}$ are recorded in $PSN_{200}$ to $PSN_{299}$, and the contents in $LBN_{400}$ to $LBN_{499}$ are recorded in $PSN_{300}$ to $PSN_{499}$. In the logical address space 9, $LBN_{100}$ to $LBN_{299}$ are set as an area for special DFs (a sector size changing area), and $LBN_{400}$ to $LBN_{9000}$ are set as an area for normal DFs and data files (hereinafter, such an area referred as "a normal process area"). One logical page corresponds to 100 physical sectors in the sector size changing area, and to 200 physical sectors in the normal process area. The setting in the logical address space 9 can be done arbitrarily, and the information regarding the setting is recorded in the volume information area of $LBN_{00}$ to $LBN_{99}$ in which information for managing a storage medium is recorded and the contents of which are reproduced immediately after the replacement of an optical disk.

FIG. 5 shows the contents of the address translation table 21 which is used in the example of FIG. 4. The column 31 indicates the start address (start LBN) of each logical page, the column 32 the information regarding the way of executing the reproduction process for LBN in the corresponding logical page, and column 33 the start address (start PSN) of the page allotted in an optical disk. In the optical disk, there is no page corresponding to the logical pages which are indicated as "not-used" in column 33 (not-used pages).

In the column 32 where the access information is recorded, pages which are subjected to the sector size adjusting process and those which are not subjected to the sector size adjusting process may be mixedly arranged. However, it is preferable to arrange pages having the same kind of the access information so that the pages have consecutive logical addresses, as shown in the logical address space 9 in FIG. 4. According to this arrangement, the information to be managed regarding the access information in the column 32 are only start LBNs and end LBNs, and it is not necessary to record access information for each pages, resulting in the facilitated area management. In the logical address space 9 in FIG. 4, for example, the way of executing the reproduction can be determined only by judging whether the logical address (LBN) is greater than 400 or less.

As shown in FIG. 4, the address translation table 21 manages the arrangement of pages in the logical address space 9 and the allocation in the optical disk. Hence, addresses in the logical address space 9 can be freely set. In FIG. 4, for example, the LBNs for special DFs are set to 100 to 399. However, it is not necessary to record special DFs in $PSN_{200}$ to $PSN_{399}$ of an optical disk, and special DFs can be allocated by the unit of a logical page to any area in an optical disk. In this case, it is not required to allocate all logical pages at one time, but it is sufficient to allocate a new logical page after when areas in logical pages which have been allocated become insufficient to record information. This process is illustrated in FIG. 6.

Figure 6:
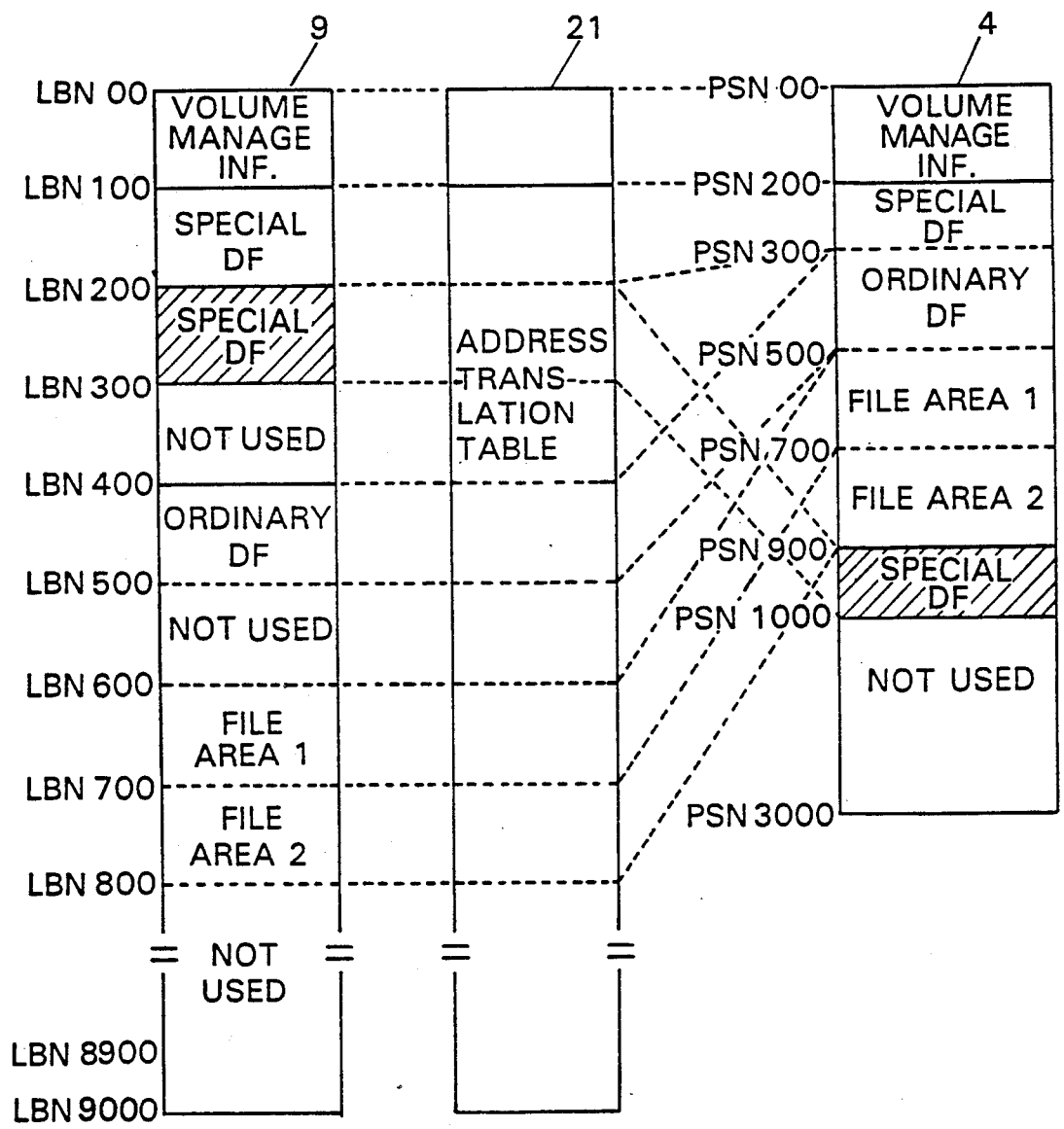
FIG. 6 shows diagrammatically the relation between LBNs with PSNs in the case that special DF areas are additionally allocated.

In FIG. 6, logical pages which have been allocated in an optical disk (pages corresponding to $LBN_{100}$ to $LBN_{199}$ in FIG. 4) become insufficient, and logical pages which are not used (pages corresponding to $LBN_{200}$ to $LBN_{299}$ in FIG. 4) are additionally allocated in $PSN_{900}$ to $PSN_{999}$ (hatched portion in FIG. 6) in the optical disk 4. In this case, the address translation table of FIG. 5 is updated to become that of FIG. 7 (see the hatched portion in FIG. 7). The updation of the address translation table 21 can be executed by recording again the newest table or by recording only the portions to be updated. Regarding the normal process area, logical pages can be additionally allocated in the same manner as the above.

In the preferred embodiment, it is not necessary to previously arrange all addresses of the logical address space 9 on an optical disk, and it is possible to additionally allocate addresses when the area becomes short. Therefore, the logical address space 9 can be freely set irrespective of the size of the optical disk and the data arrangement thereon. In a write-once type optical disk, the management information is updated on each updation or addition of files by adding new management information (or a history file indicating the updated contents), because the management information on a write-once type optical disk cannot be rewritten, resulting in that the volume of management data which is available in a practical use depends largely on the conditions of using the optical disk. According to the preferred embodiment, in the logical address space 9, the size of the area for management information can be set large, and, on the optical disk, the area for management information can be enlarged whenever the area becomes short. Consequently, the preferred embodiment can eliminate the problems such as a limited number of updating management information due to an insufficient area size, and wasted large portions in the allocated area, which are caused in a conventional managing system in which physically fixed areas allocated on a write-once type optical disk.

In the above-described system, logical pages of a fixed size are used. Alternatively, the size of each logical page is previously recorded in the address translation table 21 so that the management can be conducted by using variable-length logical pages. The areas for the sector size adjusting process may record not only the management information such as a special DF, but also other small-size files such as batch files, thereby reducing the size of wasted area. The system reproduces only one or two physical sectors. The number of physical sectors to be reproduced is not limited to the above, but can be freely selected. To accomplish this, for example, the number of the sectors to be actually reproduced is recorded for each logical block or logical page in the address translation table 21.

(B) Other preferred embodiments for aforementioned case (2) will be described.

Figure 10:
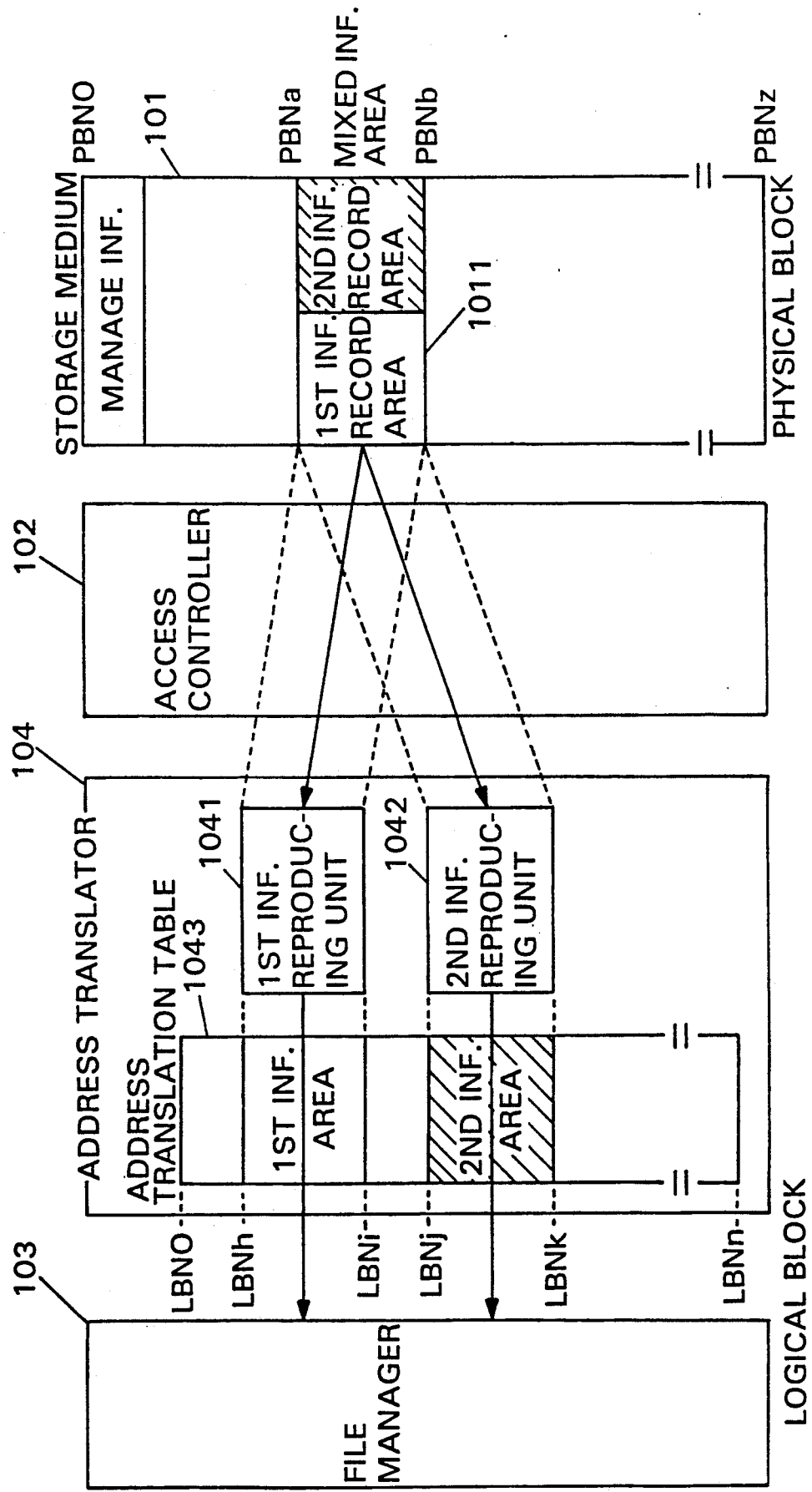
FIG. 10 is a block diagram of another system of the invention.

FIG. 10 illustrates the system diagrammatically. The system of FIG. 10 in which a write-once type optical disk is used as a storage medium 101 comprises an access control means or driver 102 for recording and reproducing information on and from the storage medium 101 using a physical block address (physical block number: PBN), a file manager 103 for managing the recording and reproduction processes with using an LBN, and an address translator 104 for conducting the information recording and reproduction processes in the PBN which corresponds to the LBN indicated by the file manager 103. In an area 1011 of the storage medium 101, two kinds of information are recorded in one block (hereinafter such an area is referred as "a mixed information area"). The address translator 104 comprises a first information reproducing unit 1041 for reproducing a first information from a physical block in which two kinds of information are recorded (hereinafter such a block is referred as "a mixed block"), a second information reproducing unit 1042 for reproducing a second information from a mixed block, and an address translation table 1043 in which data for correlating the LBN and the PBN and processes therefor are recorded. The address translator 104 may be incorporated in the BIOS or device driver of a general purpose OS.

Figure 12A:
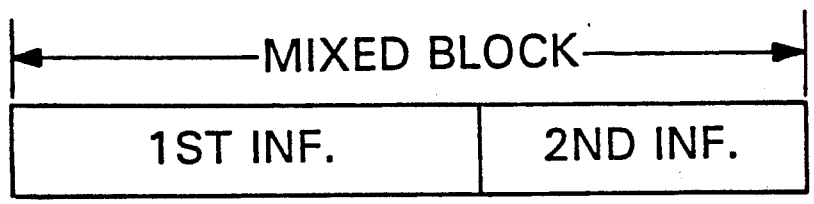
FIG. 12 shows diagrammatically the arrangement of physical blocks in the system of FIG. 10.
Figure 12B:
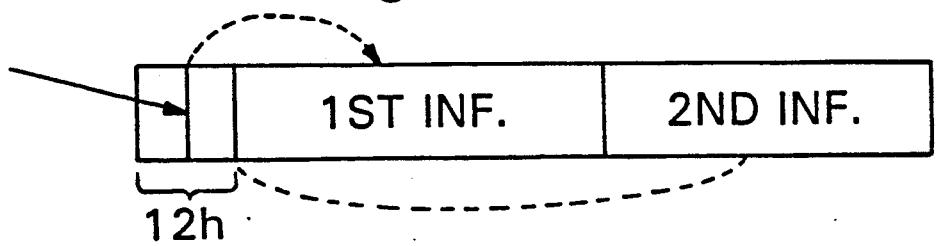
Figure 12C:
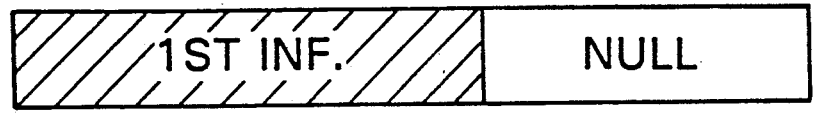
Figure 12D:
Figure 12E:

FIG. 12(a) shows a mixed block reproduced by the access controller 102 from the mixed information area 1011. The first and second information of an individual block which is handled by the file manager 103 are shown in (c), (d) and (e) of FIG. 12. When processes of recording the first and second informations are to be executed successively, these informations are compressed to the form of a mixed block shown in (a) of FIG. 12. As a result of this recording process, the first and second information can be recorded in one physical block, while, in a conventional system, two physical blocks are necessary for recording the first and second information. Accordingly, this system can effectively improve the utilization ratio of a storage medium.

When the file manager 103 requests the reproduction process, the first and second information must be reconstructed into the format shown in (c), (d) or (e) of FIG. 12. The file manager 103 manages a mixed block by using two different LBNs. In this system, therefore, the range of the LBNs for the first information (corresponding to $LBN_h$ to $LBN_i$ in FIG. 10) and those for the second first information (corresponding to $LBN_j$ to $LBN_k$ in FIG. 10) are previously set so that it is possible to judge whether either information is to be reproduced. When an instruction for the reproduction process is issued using the LBN for the first information, the information in the mixed block shown in (a) of FIG. 12 is reproduced in the format shown in (c) of FIG. 12 through the first information reproducing unit 1041, while the second information is erased by inserting NULL (00) codes into the portion recording the second information. Conversely, when an instruction for the reproduction process is issued using the LBN for the second information, the information in the mixed block shown in (a) of FIG. 12 is reproduced in the format shown in (d) of FIG. 12 through the second information reproducing unit 1042, while the first information is erased by inserting NULL (00) codes into the portion recording the first information. The format shown in (d) of FIG. 12 may be modified into that shown in (e) of FIG. 12 which is obtained by shifting the second information to the top portion and by inserting NULL codes into the other portion. In order to simplify the management, the file manager 103 needs sometimes the format shown in (e) of FIG. 12.

Another example of the format of a mixed block is shown in (b) of FIG. 12. In this format, the start point and size of each of the first and second information are recorded in the header 12h of the mixed block so that two kinds of information of variable length can be recorded.

As described above, in the system of FIG. 10, both the first and second information which are managed separately by the file manager 103 can be recorded in one physical block. When reproducing the first and second information, the system provides the file manager 103 with an emulation function by which these two kinds of information can be managed so that they are recorded in different logical blocks.

Figure 11:
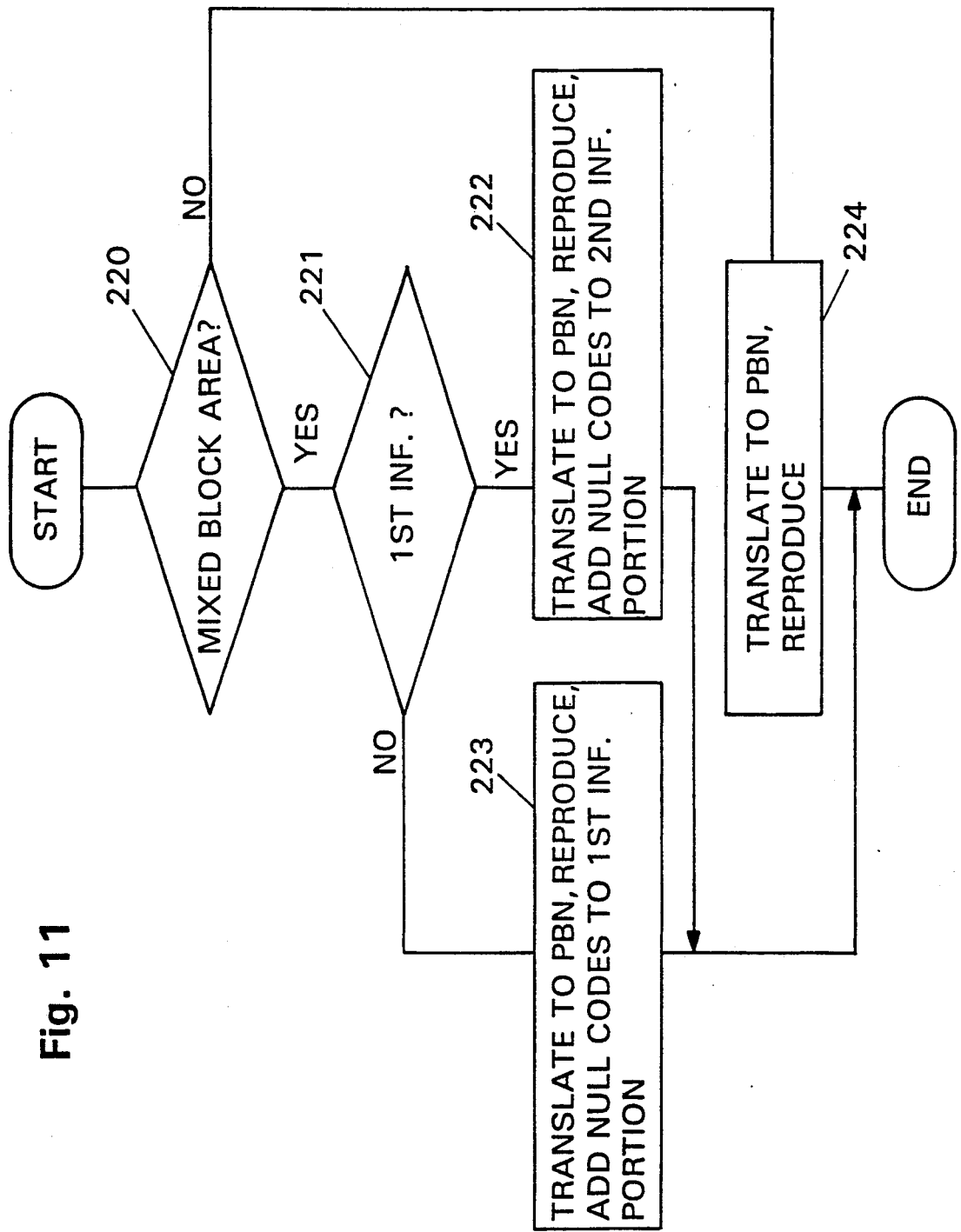
FIG. 11 is a flow chart of determining the way of conducting the recording process in the system of FIG. 10.

The operation of the system for executing the above processes using the record format shown in (a) of FIG. 12 will be described. FIG. 11 is a flow chart of the operation of the address translator 104 when the first and second information are reproduced. In this case, a mixed block has been already recorded in the storage medium 101 as shown in FIG. 11. First, the designated address is judged whether it belongs to LBNs for a mixed block ($LBN_h$ to $LBN_i$ and $LBN_j$ to $LBN_k$ in FIG. 10) (step 220). If yes, the operation proceeds to step 221, and, if no, to step 224. In step 221, the designated address is judged whether it belongs to the LBNs for the first information ($LBN_h$ to $LBN_i$ in FIG. 10). If yes, the operation proceeds to step 222, and, if no, to step 223. In step 222, the address is translated to a PBN by the address translation table 1043, and the first information recorded in the mixed block of the PBN is reproduced. The second information in the mixed block is erased by inserting NULL codes into the portion recording the second information. The reproduced first information is transferred through the first information reproducing unit 1041 to the file manager 103. In step 223, the address is translated to a PBN by the address translation table 1043, and the second information recorded in the mixed block of the PBN is reproduced. The first information in the mixed block is erased by inserting NULL codes into the portion recording the first information. The reproduced second information is transferred through the second information reproducing unit 1042 to the file manager 103. When the designated address is not any of $LBN_h$ to $LBN_i$ and $LBN_j$ to $LBN_k$, the address is translated to a PBN by the address translation table 1043, the contents in the physical block of the PBN are reproduced to be transferred to the file manager 103.

Figure 13:
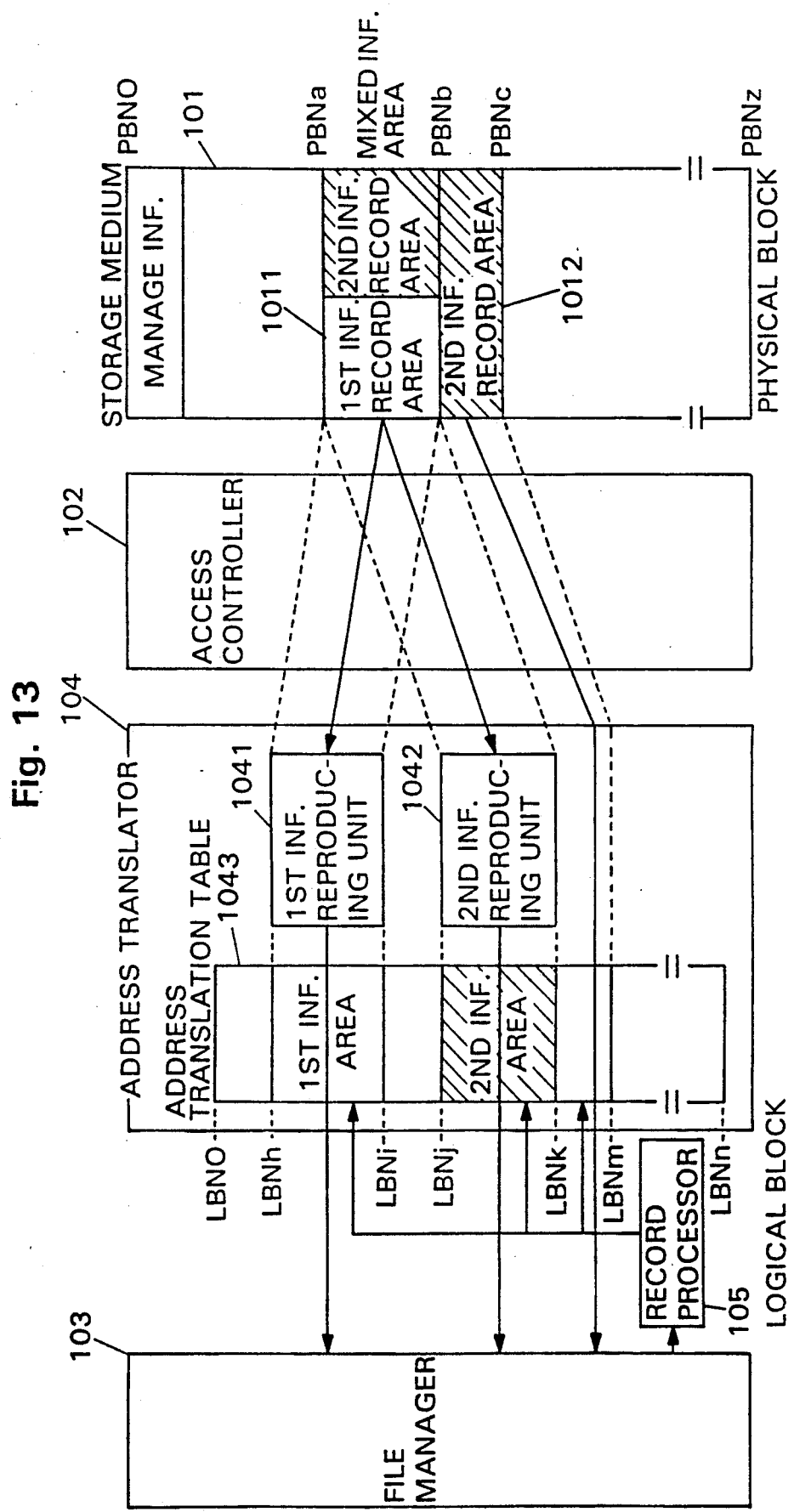
FIG. 13 is a block diagram of a further system of the invention.
Figure 15A:
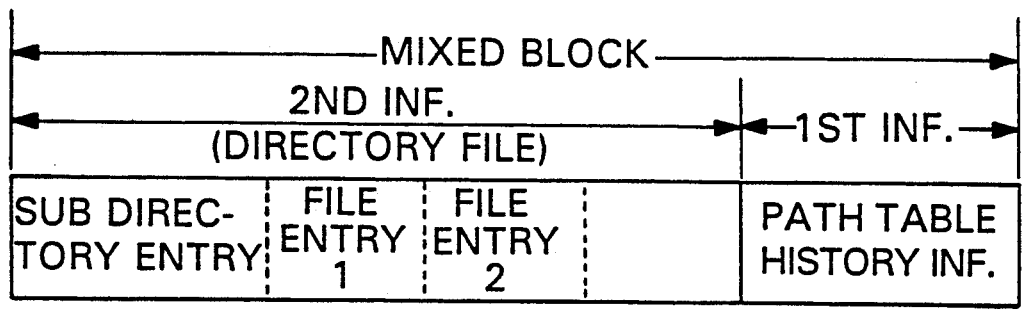
FIG. 15 shows diagrammatically the arrangement of physical blocks in a system using an optical disk.
Figure 15B:
Figure 15C:
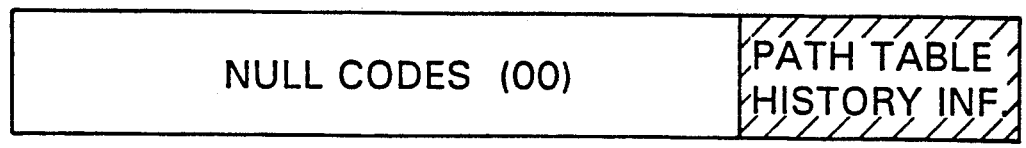
Figure 15D:
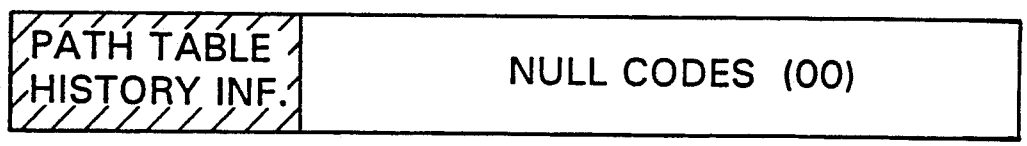
Figure 17:
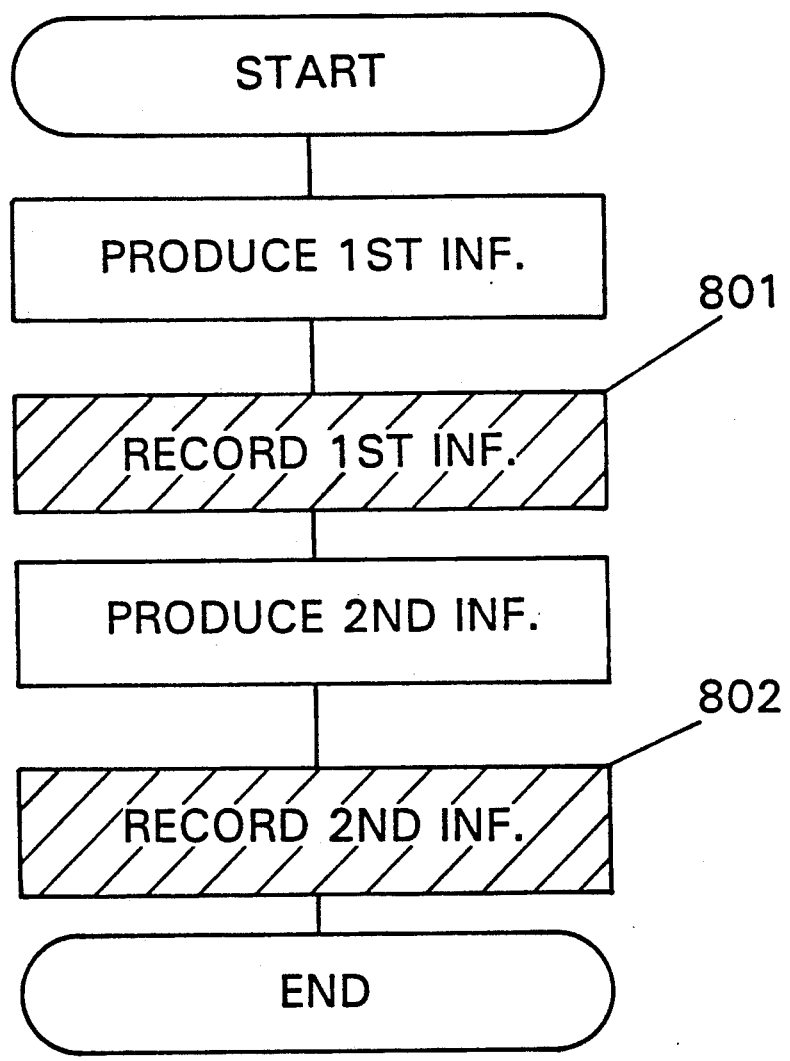
FIG. 17 is a flow chart of the recording process in the prior art.

This system requires a record processor by which the first and second information are managed so as to be recorded in a mixed block. The record processor will be described later. When the reproduction process is conducted by a general purpose OS, this record processor can be realized as an extension portion of the OS, as shown in FIG. 13. In this case, the address translator 104 can be incorporated in the BIOS of the general purpose OS so that it is not necessary to modify the reproduction process of the OS. Hence, a general purpose OS can execute the reproduction process for an optical disk and that for a storage medium of another kind such as a magnetic storage medium in the same way.

FIG. 13 illustrates a system in which two kinds of information to be recorded in one physical block are dynamically changed in size: the first information is of a fixed length; and the second information is of a variable length. A typical example of such a management system is that using the so-called high sierra format on a write-once type optical disk.

In FIG. 13, the reference numeral 105 designates the record processor which judges whether the first and second information can be mixedly recorded in one physical block and instructs the recording process, and the reference numeral 1012 designates a second information area ($PBN_b$ to $PBN_c$ in FIG. 13). The second information recording area 1012 records the second information when the total size of the first and second information is too great for mixedly recording the two kinds of information in one physical block. This recording process is illustrated in FIG. 14.

When a file is to be updated to record the first and second information, the first information is produced in step 501, and then the second information is produced in step 502. In step 503, the total size of the first and second information is compared with the size of a physical block. If the total size is not greater than the physical block size, the operation proceeds to step 504. If the total size is greater than the physical block size, the operation proceeds to step 506. In step 504, the first information and the second information are combined to form a mixed block, and then the mixed block is recorded in a mixed information area ($PBN_a$ to $PBN_b$ in FIG. 13) (step 505). In step 506, the first and second information are recorded in different physical blocks. More specifically, the first information is recorded in the mixed information area, and the second information is recorded in the second information area 1012 ($PBN_b$ to $PBN_c$ in FIG. 13).

The reproduction process in the system of FIG. 13 will be described. When the LBN designated by the file manager 103 is one of LBNs for the mixed information area 1011 ($LBN_h$ to $LBN_i$ and $LBN_j$ to $LBN_k$), the same reprouduction processes as described above are executed, and the first or second information is reproduced through the first or second information reproducing unit 1041 or 1042. When the LBN designated by the file manager 103 is one of LBNs for the second information area 1012 ($LBN_k$ to $LBN_m$), the contents of the corresponding physical block in the second information area 1012 are reproduced by the driver 102, and are transferred to the file manger 103 without being subjected to the process of the address translator 104.

FIG. 16 illustrates an example of the address translation table 1043 in which the judgment is conducted by the unit of a logical page in the same manner as that shown in FIG. 4. In FIG. 16, the column 701 indicates the start address (start LBN) of each logical page, the column 702 the information (access information) regarding the way of executing the reproduction process for LBN in the corresponding logical page, and the column 703 the start address (start PBN) of the page allocated in an optical disk. In the optical disk, there is no page corresponding to the logical pages which are indicated as "not-used" in the column 703. The table of FIG. 16 can be updated in the same way as that of FIG. 7.

This system can execute the recording operation in accordance with the total size of the first and second information to be recorded. In other words, when the total size is not greater than the size of a physical block, the first and second information are mixedly recorded in one physical block, and, when the total size is greater than the size of a physical block, the first and second information are recorded in different physical blocks.

The systme uses a DF for managing the directory, and a path table for managing the hierarchy relationship. As shown in FIG. 15, a DF comprises a sub directory entry in which the recording position, size and identifier of the DF of the sub directory are recorded, and first and second file entries in which the recording position, size and identifier of the file stored in the directory. The size of a DF depends on the number of files and that of entries, and is generally small (about several hundred bytes). A recording operation for updating a file in this system generates the path table history information (the first information) and the new DF (the second information). The path table history information, which is a differential information, is small in size (about one hundred bytes).

Accordingly, in a system for managing an optical disk according to the invention, the utility ratio of the optical disk can be improved to be two times that achieved in a conventional system.

In the above description, the record processor is realized as an extension portion of a general purpose OS. The record processor may be incorporated in a specialized date processing system such as a CD-ROM publishing system. In this case, the addesss translator can be incorporated in the driver portion of a general purpose OS.

According to the invention, three or more different kinds of information also can be mixedly recorded. When the systems described in (A) and (B) are combined, moreover, the utility ratio of a storage medium can be improved more effectively.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A system for managing a storage medium in which a storage area is identified by a plurality of virtual logical blocks, each of said logical blocks being of a size which is n times of a physical sector where n is an integer equal to or greater than one, and said storage area being divided into a plurality of subregions, each subregion containing a plurality of said logical blocks, the logical block contained in each subregion having different physical sectors, said system comprising:

medium control means for recording and reproducing data on and from addresses associated with said physical sectors;

data management means for instructing record and reproduction of data in terms of addresses associated with said logical blocks;

address translation means for preparing a translation table, said translation table defining a relationship between the addresses associated with said logical blocks and the addresses associated with said physical sectors, and also defining a number m of physical sectors where m is an integer, and $1 \leq m \leq n$, which are subjected to record or reproduction by said medium control means in response to the instruction of recording or reproducing by one said logical blocks designated by said data management means;

record means for referring to said translation table to obtain the address of a physical sector and the physical sector numbers m, in response to the instruction of recording data into the address of a given logical block from said data management means, and for, when the total of the physical sector numbers m coincides with the size of said given logical block, recording the whole of the data, and for, when the total of the physical sector numbers m is smaller than the size of said given logical block, recording a portion of the data by said medium control means, the size of said recorded portion corresponding to said total of the physical sector numbers m; and reproduction means for referring to said translation table to obtain the address of a physical sector and the physical sector numbers m, in response to the instruction for reproducing data from the address associated with a given logical block address designated by said data management means, and for, when the total of the physical sector numbers m is smaller than the size of said given logical block, reproducing data of the m number of said physical sectors of said address of said physical sector by said medium control means and then adding predetermined data to the reproduced data, the size of said added data corresponding to the shortage of said the physical sector numbers m with respect to the size of said logical block.

2. A system according to claim 1, wherein said address translation means comprises translation table updating means for updating at least one of said relationship between the addresses associated with said logical blocks and the addresses associated with said physical sectors and said number m of physical sectors which are subjected to record or reproduction in response to the instruction of recording or reproducing per one logical block.

3. A system according to claim 1, wherein said storage medim is a write-once type optical disk.

4. A system for managing a storage medium in which a storage area is identified by a plurality of virtual logical blocks, each of said logical blocks having n number of continuous physical sectors where n is an integer equal to or greater than one, each said logical blocks including an address region which is divided into subregions, said physical sectors comprising a plurality of physical blocks, at least a portion of said physical blocks being duplicated physical blocks, each duplicated physical block corresponding to a plurality of logical addresses which belong to different subregions, and each of said duplicated physical blocks being divided into a plurality of subportions, said system comprising:

medium control means for recording and reproducing data on and from addresses associated with said physical blocks;

data management means for instructing record and reproduction of data in terms of addresses associated with said logical blocks;

address translation means for preparing a translation table, said translation table defining a relationship between the addresses associated with said logical blocks and the addresses associated with said physical blocks, an indicator for indicating whether or not each of said corresponding physical block addresses is a duplicated physical block, and for indicating the subportions of said duplicated physical blocks which correspond to said addresses of logical blocks;

reproduction means for referring to said translation table to obtain the address of a physical block and said indicator, in response to the instruction of reproducing data from the address of a given logical block address from said data menagement means, and for, reproducing said physical block by said medium control means and when said physical block is an duplicated physical block, substituting subportions other than the subportions which correspond to said logical block address with predetermined data; and record means for referring to said translation table to obtain the address of a given physical block and said indicator, in response to the instruction of recording data into the address of said given logical block from said data management means, and for, when said physical block is an duplicated physical block, combining subportions of said data which correspond to said address of said given logical block with other subportions and recording said data to said physical block address by said medium control means.

5. A system according to claim 4, wherein said address translation means comprises translation table updating means for updating at least one of said relationships between addresses of said logical blocks and addresses of said physical sectors, said indicator, and said subportions.

6. A system according to claim 4, wherein said storage medium is a write-once type optical disk.

* * * * *